United States Patent [19]
Chatterjee et al.

[11] Patent Number: 5,679,611
[45] Date of Patent: Oct. 21, 1997

[54] CERAMIC ARTICLE CONTAINING A CORE COMPRISING TETRAGONAL ZIRCONIA AND A SHELL COMPRISING ZIRCONIUM NITRIDE

[75] Inventors: Dilip K. Chatterjee; Syamal K. Ghosh, both of Rochester; Gregory S. Jarrold, Henrietta, all of N.Y.

[73] Assignee: Eastman Kodak Company, Rochester, N.Y.

[21] Appl. No.: 728,384

[22] Filed: Oct. 9, 1996

[51] Int. Cl.[6] .................... C04B 35/48; C04B 35/58
[52] U.S. Cl. ................... 501/96; 501/98; 501/103; 501/105; 252/520; 428/660; 428/661; 428/651; 428/656
[58] Field of Search ................... 501/96, 98, 103, 501/105; 252/520; 428/660, 661, 651, 656

[56] References Cited

U.S. PATENT DOCUMENTS

| | | | |
|---|---|---|---|
| 4,528,121 | 7/1985 | Matsushita et al. | 252/516 |
| 5,045,512 | 9/1991 | Lange et al. | 501/96 |
| 5,177,037 | 1/1993 | Schuldies | 51/309 |
| 5,290,332 | 3/1994 | Chatterjee et al. | 65/18.1 |
| 5,336,282 | 8/1994 | Ghosh et al. | 51/309 |
| 5,358,913 | 10/1994 | Chatterjee et al. | 501/103 |
| 5,411,690 | 5/1995 | Ghosh et al. | 264/63 |

FOREIGN PATENT DOCUMENTS 59-227771  12/1984  Japan.

*Primary Examiner*—Mark L. Bell
*Assistant Examiner*—Louis M. Troilo
*Attorney, Agent, or Firm*—Arthur H. Rosenstein

[57] ABSTRACT

A ceramic article containing a core comprising zirconia and $ZrB_2$ composite wherein zirconia is preferably doped with yttria, and a shell comprising zirconium nitride.

4 Claims, 5 Drawing Sheets

CERAMIC ARTICLE CONTAINING A CORE COMPRISING TETRAGONAL ZIRCONIA AND A SHELL COMPRISING ZIRCONIUM NITRIDE

FIELD OF THE INVENTION

This pertains to ceramic articles and methods for preparing ceramic items and more particularly to articles having a core consisting essentially of zirconia said core being electrically insulating whose surface layers are primarily zirconium nitride which is electrically conductive for use as tools.

BACKGROUND OF THE INVENTION

In the production of materials such as photographic films and papers; cutting tools, such as perforators and slitter knives, require impact resistance to eliminate catastrophic failures, and corrosion, wear and abrasion resistance to improve service life and productivity. Conventional cutting tool materials, such as high speed steels, hardenable stainless steels, and cemented tungsten carbides, meet some of these requirements but have considerable limitations to warrant improved service life. Conventional cutting tool materials also have the limitation of requiring frequent maintenance due to wear, abrasion and corrosion.

Ceramic zirconia materials such as tetragonal zirconia polycrystal (TZP) and yttria-doped tetragonal zirconia polycrystal (Y-TZP) ceramic materials and composites of zirconia and alumina offer many advantages over conventional materials and are therefore used in cutting, perforating, slitting and chopping of photographic film and paper webs. Y-TZP is one of the toughest ceramics. The toughness is achieved at the expense of hardness and or strength. Tetragonal zirconia alloy, the product of sintering a particulate mixture of zirconia and some stabilizing dopants is a tough and relatively soft structural material but has many attractive properties such as high fracture toughness and corrosion resistance. However, tetragonal zirconia alloy has tribological properties that are not as attractive as other high performance structural ceramics like SiC and $Si_3N_4$. Example of materials having good hardness and strength is monolithic cubic spinel, SiC and $Si_3N_4$ however, these materials have unusually high brittleness and are unusable for structural applications, particularly for cutting tool applications.

It is known that impact bearing tools or parts have a longer service life and better performance if made with a core of a tough material and a surface or shell of a hard material. Common examples for metallic materials include nitrided or case carburized metal tool parts, camshafts and the like. A surface treatment such as carburizing or nitriding is used to form a stable hard phase over a tougher core. The phase changes are dependent upon the reactivity of the parent metallic material with a reacting material, for example, a carbon or nitrogen species. In ceramics, inherent chemical inertness has impeded the preparation of comparable composite structures. Tetragonal zirconia ceramic articles having surface areas with stress induced phase changes are very easy to achieve, since such phase changes occur as a result of abrasion on working surfaces during use. With Y-TZP, stress induces transformation from a tough, but not very hard tetragonal phase to a harder monoclinic phase. This phase change can be utilized in different ways. Net shape tetragonal zirconia alloy articles can be produced as disclosed in U.S. Pat. No. 5,290,332. The term "net shape" is defined as a ceramic article that is dimensionally true after sintering and therefore does not necessitate further machining prior to use in its intended working environment. During use, working surfaces of a net shape article will be subject to phase transformation due to its wear and abrasion. Suitable tolerances will permit abrasion losses at working surfaces, prior to phase transformation, to be ignored. Alternatively, surface phase transformation of tetragonal zirconia to monoclinic zirconia can be induced by an abrading process, such as grinding or lapping, during fabrication of the tool. Neither approaches are straight-forward in that two variables, the dimensions of the article and its phase characteristics are changing simultaneously. Both approaches are extremely problematic when attempted with an article having a complex geometry.

An alternative approach is taught by U.S. Pat. No. 5,358,913; which is hereby incorporated herein by reference. In that approach, a tetragonal zirconia alloy article, which can be near net shape, is compacted and then sintered in the presence of an MgO, CaO, $Y_2O_3$, $Sc_2O_3$, $CeO_2$, or rare earth oxide dopants and their combinations thereof to produce an article having a tetragonal core and a cubic phase shell. The dopant can be provided in a number of different forms such as a solid plate, a powder, or a layer produced by decomposition of an organo-metallic precursor film. In U.S. patent application Ser. No. 07/994,820 now abandoned in favor of Continuation-in-Part Application Serial No. 08/231,870, filed Apr. 25, 1994 and divisional application Ser. No. 08/506,629 filed 25 Jul. 1995; a method is described for producing articles having a tetragonal zirconia alloy core and a monoclinic shell by diffusion control. In U.S. patent application Ser. No. 07/994,818 now abandoned in favor of a Continuation-in-Part application Ser. No. 08/400,416, filed 03 Mar. 1995, which is hereby incorporated herein by reference; a method is described for producing articles having a tetragonal zirconia alloy and alumina core and a shell of tetragonal zirconia and cubic spinel. In the core and the shell the predominant species is tetragonal zirconia. The application also teaches a method for producing articles having a core that is tetragonal zirconia alloy along with less than about 5 weight percent alumina and having a shell that is cubic phase zirconia and cubic spinel.

In "Electrical Conductivity of $ZrN-Al_2O_3$, $Mo-Al_2O_3$ and ZrN-Mo Composite Powders", by F. F. Egorov, Poroshkovaya Metallurgiya, vol. 19, No. 10, pp. 56–60, Oct. 1980, it is taught that the electrical resistivity of samples of various compositions sintered in nitrogen is an order of magnitude higher than that of samples sintered under identical time and temperature conditions in argon and forms nonconductivity in zirconia on their surfaces.

In U.S. Pat. No. 5,177,037 an electro-discharge machinable ceramic containing at least one non-electroconductive and one electroconductive ceramic whisker component is used. This patent does not describe tetragonal zirconia materials.

In Japanese Patent 83102881, stabilized zirconia of 94 to 88 mole percent blended with 6 to 12 mole percent stabilizer of MgO, CaO, $Y_2O_3$, and CeO is described as being prepared from a mixture of stabilized zirconia and zirconium diboride by hot processing or sintering under ordinary pressure at temperatures above 1400° C.

In cutting, perforating, or slitting of multilayered webs such as photographic films and paper one encounters the problem of debris generated during the operations. Smart tool design can alleviate this problem to some extent. However, the electrostatic charges accumulated on the tool surfaces can attract the debris. This problem can be reduced, if not eliminated, provided the tool surface can dissipate the electrical charge generated due to friction between the tool and the work surface.

One of the biggest drawbacks of zirconia alloys such as TZP and Y-TZP and composites based on zirconia and alumina tool materials is that they are highly electrically insulating at room temperature and therefore are unsuitable for finishing operations which are normally carried out at room temperature. These operations are unsuitable because the product quality is unacceptable, because it is dirty due to debris attraction by the tool, because it is non-conductive and because it generates electro-static charges. Many attempts have been made by others to make zirconia alloy such as TZP and its composites electrically conductive but at the expense of degradation of its mechanical properties, especially its fracture toughness. It is an object of the invention to induce surface electrical conductivity on TZP and Y-TZP materials without jeopardizing its mechanical properties significantly so that cost-effective finishing operations of multi-layered webs can be performed and product rejection due the debris is minimized/eliminated. Another part of this invention deals with the preparation of a ceramic article with surface electrical conductivity in an effective way so that the secondary steps are avoided by carrying out in-situ surface modification during the sintering operation of the ceramics.

SUMMARY OF THE INVENTION

This invention relates to in-situ surface modification of zirconia such as TZP matrix composite containing zirconium diboride ($ZrB_2$), as accomplished during sintering in nitrogen and 4% hydrogen-nitrogen environment, yielding a surface which is highly electrically conductive whereas the bulk remains insulating. This relates to diffusion controlled exchange reactions during sintering at 1200° to 1600° C. in which the surface is converted to electrically conductive zirconium nitride (ZrN) as verified by x-ray diffraction. A functionally gradient material with varying ZrN concentration from one end to the other can be made depending on the amount of $ZrB_2$ present, as well as sintering temperature and sintering time. The bulk crystal structure is primarily cubic zirconia with a minor (trace) amount of monoclinic phase being present.

The resulting ceramic article contains a core or bulk comprising predominately cubic or tetragonal zirconia depending on the composition of $ZrB_2$ and a shell or surface comprising predominately zirconium nitride.

BRIEF DESCRIPTION OF THE DRAWINGS

The above-mentioned and other features and objects of this invention and the manner of attaining them will become more apparent and the invention itself will be better understood by reference to the following description of an embodiment of the invention taken in conjunction with the accompanying drawing wherein.

DETAILED DESCRIPTION OF THE PREFERRED EMBODIMENTS

In the method of the invention, tetragonal zirconia ceramic and a compound, zirconium diboride in powder forms were thoroughly mixed mechanically and/or chemically and were compacted and sintered. The sintering is performed in the atmosphere of from 3 to 5 mole % hydrogen and 97 to 95 mole % Nitrogen gas mixtures. The resulting ceramic article of the invention has a shell or surface of essentially zirconium nitride and a core or bulk of essentially zirconia.

The methods of the invention utilize particulate alloys of cubic or tetragonal $ZrO_2$ made from a chemical mixture of pure $ZrO_2$ and an additional "secondary oxide" selected from: MgO, CaO, $Y_2O_3$, $Sc_2O_3$ and $CeO_2$ and other rare earth oxides (also referred to herein as "Mg-Ca-Y-Sc-rare earth oxides"). Zirconia alloys useful in the methods of the invention have a metastable tetragonal crystal structure in the temperature and pressure ranges at which the ceramic article produced will be used. For example, at temperatures up to about 200° C. and pressures up to about 1000 MPa, zirconia alloys having, in the case of $Y_2O_3$, about 0.5 to about 5 mole percent; in the case of MgO, about 0.1 to about 1.0 mole percent, in the case of $CeO_2$, about 0.5 to about 15 mole percent, in the case of $Sc_2O_3$, about 0.5 to about 7.0 mole percent and in the case of CaO from about 0.5 to about 5 mole percent relative to the total of zirconium oxide alloy. Preferred oxides for alloying with zirconia are $Y_2O_3$, MgO, CaO, $CeO_2$, $SG_2O_3$, rare earth oxides and combinations of these oxides. It is preferred that the zirconia powder have high purity, greater than about 99.9 percent. Specific examples of useful zirconia alloys include: tetragonal structure zirconia alloys having from about 0.5 to about 5 mole percent and preferably about 2 to about 5 mole percent $Y_2O_3$, or more preferably about 3 mole percent $Y_2O_3$. In the case of MgO, 0.1 to 1.0 mole percent provides tetragonal structure and for $CeO_2$, 0.5 to 15 mole percent provides tetragonal structure, calcium oxide of 0.5 to about 5 mole percent produces a tetragonal structure and $SC_2O_3$ at about 0.5 mole percent to 7.0 mole percent produces a tetragonal structure. Examples of tetragonal structure zirconia alloys useful in the methods of the invention are disclosed in U.S. Pat. Nos. 5,290,332 and 5,411,690. Such zirconia alloys are described in those patents as being useful to provide a "net shape" ceramic article: a ceramic article that is dimensionally true after sintering and therefore does not necessitate further machining prior to use in its intended working environment.

This particulate $ZrO_2$ alloy is further mixed with particulate $ZrB_2$ and milled thoroughly.

Figure 1:
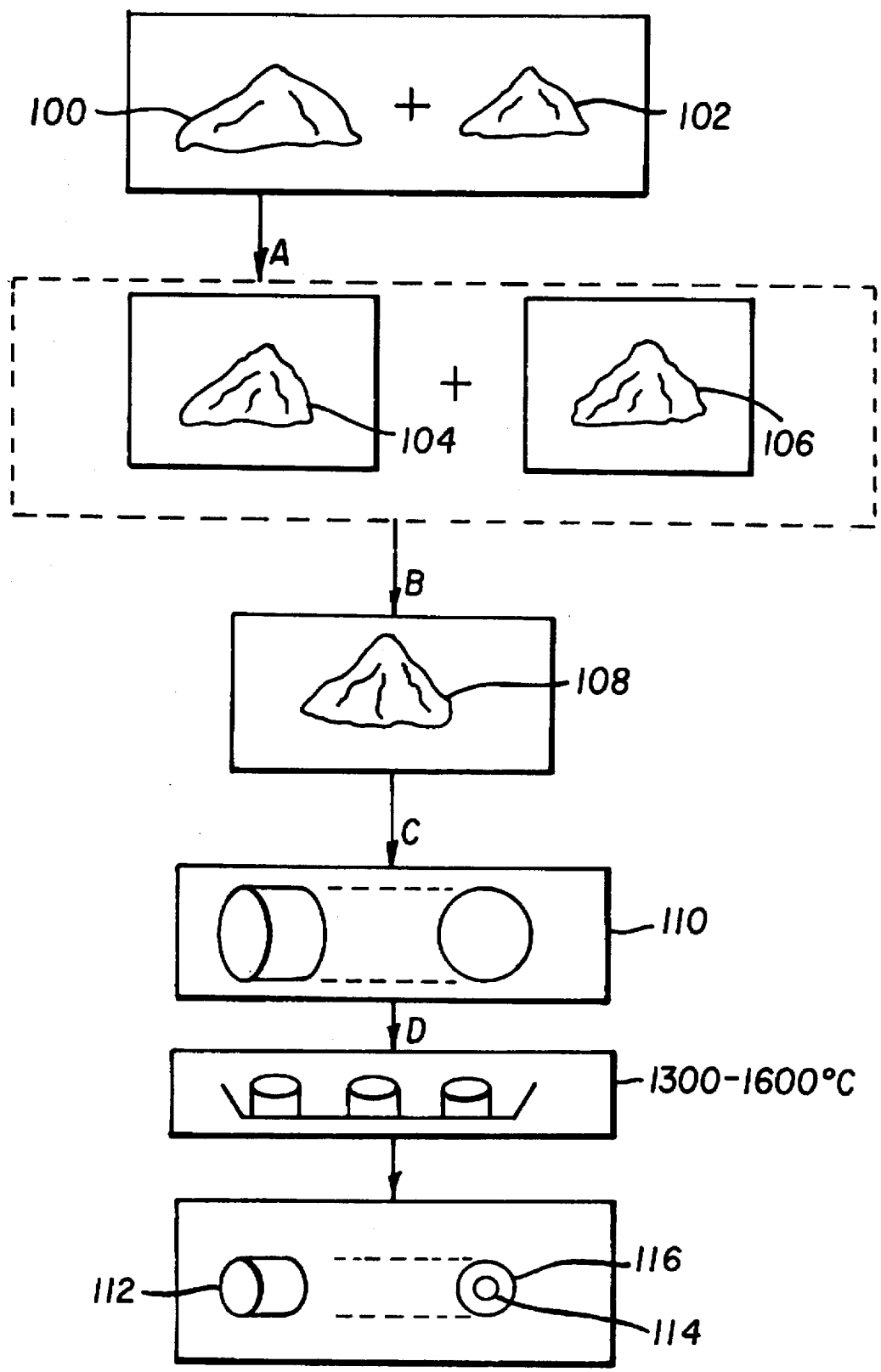
FIG. 1 is a schematic diagram of the method of the invention.

Step "A" in FIG. 1, diagrammatically illustrates the alloying process. Zirconia powder 100 is combined with one or more secondary oxide powders 102 to provide zirconia alloy powder 104. The preparation of zirconia alloys is well known to those skilled in the art and zirconia alloys are available commercially. For example, particulate zirconia alloy having 3 mole percent $Y_2O_3$ is marketed by Z-TECH Corporation, Bow, New Hampshire (presently known as HANWHA Advanced Ceramics), as "SYP-ULTRA 5.2" or "HWA-3YB" Yttria Stabilized Zirconia and TOSHO Corporation of Japan as "TZ-3YB."

The grain and agglomeration sizes and distributions, moisture contents, and binders (if any) can be varied in the zirconia alloy and zirconium diboride compound, in a manner known to those skilled in the art. "Grain" is defined as an individual crystal, which may be within a particle, having a spatial orientation that is distinct from that of adjacent grains. "Agglomerate" is defined as an aggregation of individual particles, each of which may comprise multiple grains. In a particular embodiment of the invention, the grain and agglomeration sizes and distributions, and moisture contents of the zirconia alloy and zirconium diboride compound are substantially the same and are selected as if the zirconia alloy was not going to be mixed with the zirconium diboride, that is in a manner known to the art to be suitable for the preparation of a zirconia alloy article.

An example of convenient particulate characteristics for a particular embodiment of the invention is the following. Purity is preferably well controlled at 99.9 to 99.99 percent, that is, impurities are no more than about 0.1 to 0.01 percent. The grain size is from about 0.1 micrometers to about 0.6 micrometers. The average grain size is 0.3 micrometers. The distribution of grain sizes is: 5–15 percent less than 0.1 micrometers, 40–60 percent less than 0.3 micrometers, and 85–95 percent less than 0.6 micrometers. The surface area of each individual grain ranges from about 10 to about 15 $m^2/gram$ or is preferably 14 $m^2/gram$. Agglomerate size is from about 30 to about 60 micrometers and average agglomerate size is 40–60 micrometers. Moisture content is about 0.2 to 1.0 percent by volume of blank and is preferably 0.5 percent. The mixture of particulates is compacted in the presence of a binder such as gelatin, PEG, acrylic, or polyvinyl ionomer or more preferably polyvinyl alcohol. The binder is added to and mixed in with the particulate mixture, for example by spraying or ball milling prior to placement of the powder mixture in a compacting device.

Step "B" in FIG. 1, diagrammatically illustrates the mixing of the particulate zirconia alloy 104 and the zirconium diboride compound 106. The mixing can be mechanical or alternatively can be chemical, for example, mixing by coprecipitation.

The particulate mixture of zirconia alloy 104 and zirconium diboride compound 106 results in a composite particulate mixture 108 which is compacted; heated to a temperature range at which sintering will occur; sintered, that is, maintained at that temperature range for a period of time; and then cooled to room temperature. During all or part of sintering, the particulate mixture is in contact with mixtures of hydrogen and nitrogen gases in a ratio of 3–5 to 97–95. In FIG. 1, element 110 represents the product of both mixing and compaction, indicated by arrow "C" is referred as "green preform". Compaction and sintering are generally discussed herein as two consecutive operations, as indicated by "C" and "D" in FIG. 1, however, the invention is not limited to a particular sequence of compacting and sintering. For example, compaction and sintering can be simultaneous in a single operation or partial compaction can be followed by sintering and further compaction utilizing a process like hot isostatic pressing (HIP). The fully sintered and interim product of partial compacting and partial sintering operations is referred to herein as a "blank", which is illustrated as element (blank) 112 in FIG. 1. Blank 112 is at least partially compacted and is either unsintered 110 or not fully sintered, or alternatively, is fully sintered or hot isostatically pressed 112.

Completion of compacting and sintering provides the finished ceramic article 112, which has a core or bulk 114 substantially composed of zirconia alloy and a shell or surface 116 substantially composed of zirconium nitride.

In a preferred method of the invention, the powder is cold compacted to provide a "green preform", which has a "green" density that is substantially less than the final sintered density of the ceramic article 112. The final sintered density of the shell or the surface 116 differs slightly from the final sintered density of the core 114, however, except for very small articles 112, this difference can be ignored and final sintered density can be considered to equal the density of the core or bulk after sintering. It is preferred that the green density be between about 40 and about 65 percent of the final sintered density, or more preferably be about 60 percent of the final sintered density.

For a particular powder distribution, the green density is largely dependent upon the compaction pressure and the fill ratio. Preferred compaction pressures in the methods of the invention are about 10,000–30,000 psi (69–207 MPa). A more preferred compaction pressure is about 15,000 psi (about 100 MPa). The fill ratio is maintained at from about 2.5 to 1 to about 3.5 to 1. A preferred fill ratio is about 3.0 to 1. Compaction time can be readily determined by the operator depending upon the compaction pressure selected. Compaction time, for example, can be in the range of from about 60 seconds to about 10 seconds for compaction pressures in the range of about 12,000 psi to about 18,000 psi, respectively. For a compaction pressure of 15,000 psi (100 MPa), the compaction time can be 30 seconds. It is well known that the compaction pressure and time selected by the operator will influence the size of the finished part 112. Generally, as the part size increases, compaction time is increased.

The methods of the invention are limited to particular sintering pressure and temperature conditions. Sintering can be performed at atmospheric pressure or alternatively a higher pressure can be used during all or part of the sintering to reduce porosity. The sintering is continued for a sufficient time period for the article being sintered to reach a thermodynamic equilibrium structure. An example of a useful range of elevated sintering pressures is from about 69 MPa to about 207 MPa, or more preferably about 100–103 MPa. An example of a useful range of sintering temperatures is from about 1200° to about 1600° C., or more preferably about 1300° C. An example of a useful range of sintering times is from about 1 hour to about 3 hours or more preferably about 2 hours. In a particular embodiment of the methods of the invention, the sintering peak temperature is 1300° C. and that temperature is maintained for about 2 hours. The thickness of the functionally gradiant conductive layer can be varied by varying the sintering temperature and/or time. The compacting and sintering processes can be done simultaneously, if desired.

It is preferred that the sintered blank be slowly heated to sintering temperature and slowly cooled so as to avoid undesirable dimensional changes leading to crack development in the ceramic articles. In an embodiment of the invention having a preferred sintering temperature of 1500° C., preferred temperature ramps during heating are: about 0.3° C./minute from room temperature to about 300° C., about 0.1° C./minute from about 300° C. to about 400° C., about 0.4° C./minute from about 400° C. to about 600° C., and about 1.5° C./minute from about 600° C. to about 1500° C. Preferred temperature ramps during cooling are: about 2° C./minute from about 1500° C. to about 800° C. and about 1.6° C./minute from about 800° C. to room temperature.

The exact manner in which the "green preforms" are sintered to produce the said article in this invention is not critical, however, the "shell", as that term is used herein, is limited to those areas of the blank in contact with the gas mixture during sintering. It is therefore, imperative that a uniform, unobstructed flow of gas mixture surrounding the "green preforms" to produce an uniformly conductive shell of surface on the blanks.

Referring to FIG. 1, an electrically conductive ZrN outer layer is formed on an otherwise insulating zirconia core. Sample preparation involved milling "TZ-3YB" (TOSHO Corporation of Japan) which is 3 mol % yttria alloyed to yield tetragonal $ZrO_2$, (104) and Alfa products $ZrB_2$ (106) at concentrations of 0, 10, 25 and 50 weight percent with Burundum™ milling media for three hours. The mixed powder 108 was then pressed uniaxially to a cylinder 110 using a 1 inch diameter cylindrical die at 15,000 psi (10,000 to 20,000 psi range). The resulting green part 110 was then sintered at 1300°–1600° C. by placing it on an alumina boat within a CM™ tube furnace in an atmosphere of 4% $H_2$+96% $N_2$ at a flow rate of 1.0 to 3.0 liters per minute (LPM), preferably 2 LPM. The crystalline structure and electrical conductivity of both surface and the bulk for each sintered sample 112 were then determined employing glancing angle X-ray diffraction and coupled angle X-ray diffraction techniques respectively. A conductive outer layer 116, identified as ZrN was detected by glancing angle whereas the inner core 114 was identified to be predominantly cubic $ZrO_2$. Working examples (1 to 4) of various chemical compositions of particulate mixtures along with the experimental results are summarized in Table 1. In comparative example 1, wherein no $ZrB_2$ was added to the particulate mixture can be considered with working example 1 wherein the importance of $ZrB_2$ in the present invention is shown. Sintering of the above samples was also done in $N_2$ atmosphere and the x-ray diffraction showed a very weak ZrN peak but was unable to measure any electrical conductivity (explained in comparative Example #1)

Working Examples 1–3

Figure 2:
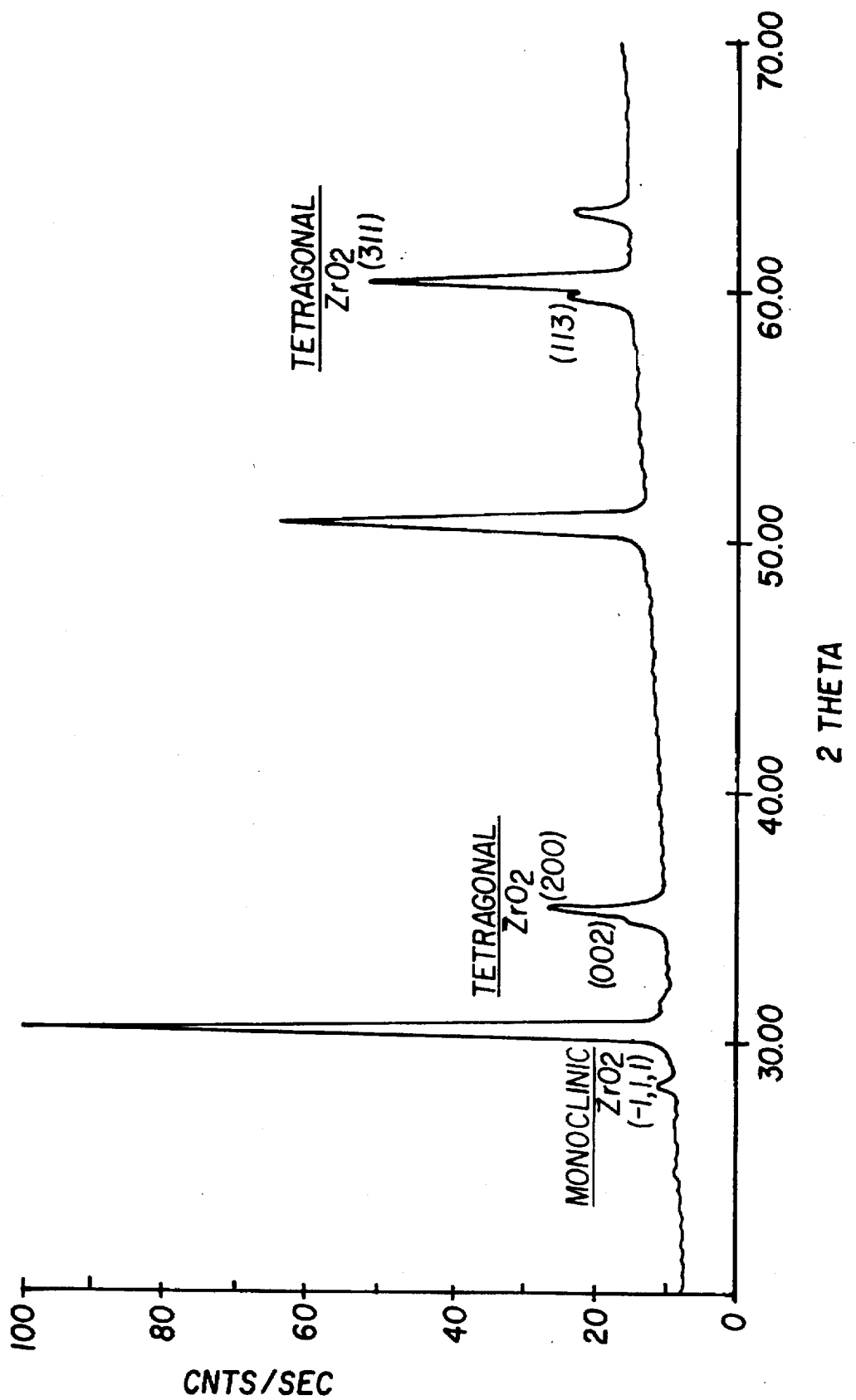
FIG. 2 shows x-ray diffraction dam of an article showing the presence of predominately tetragonal phase.
Figure 3:
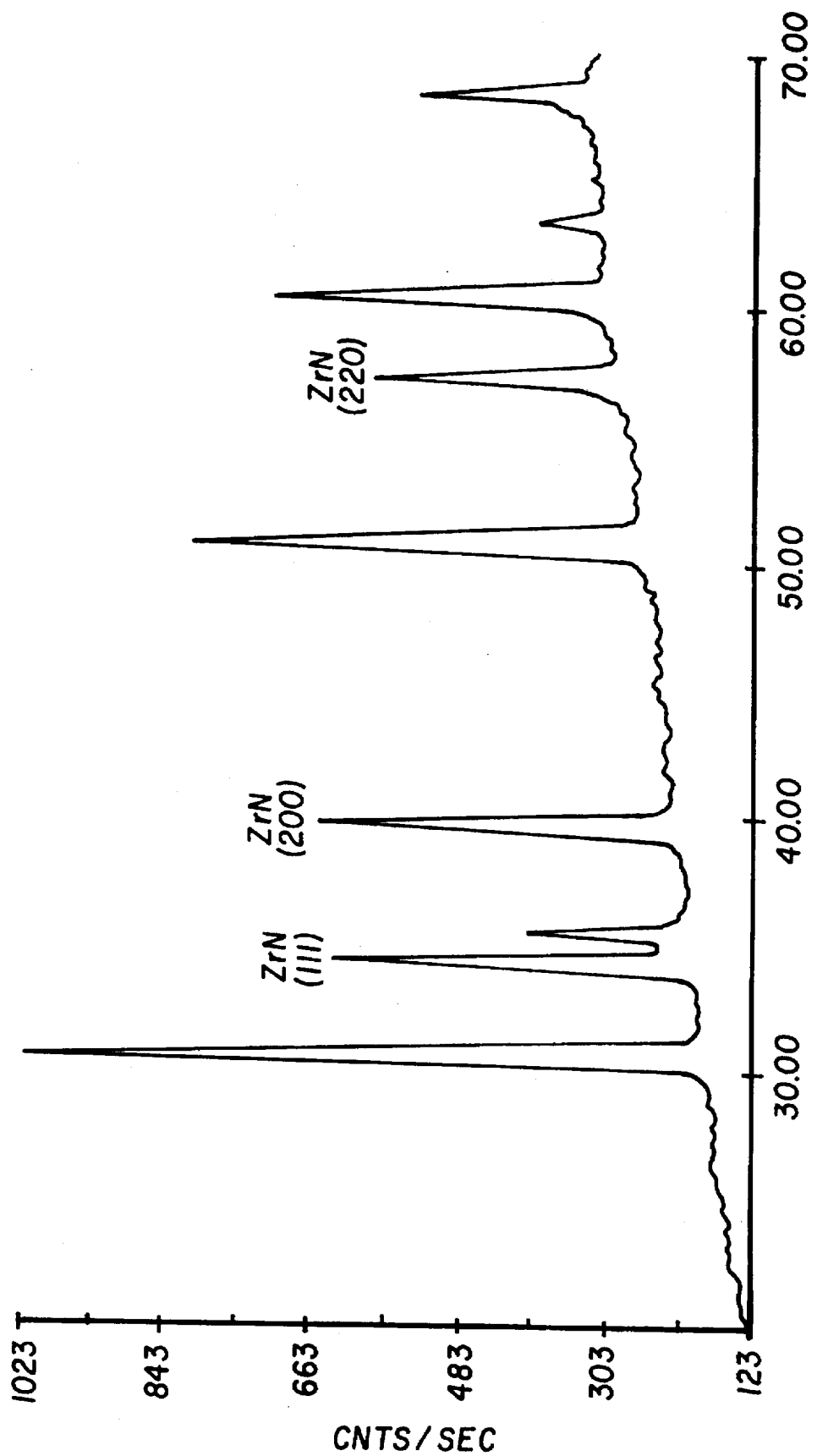
FIG. 3 shows x-ray diffraction dam of an article showing the presence of strong ZrN diffraction peaks.
Figure 4:
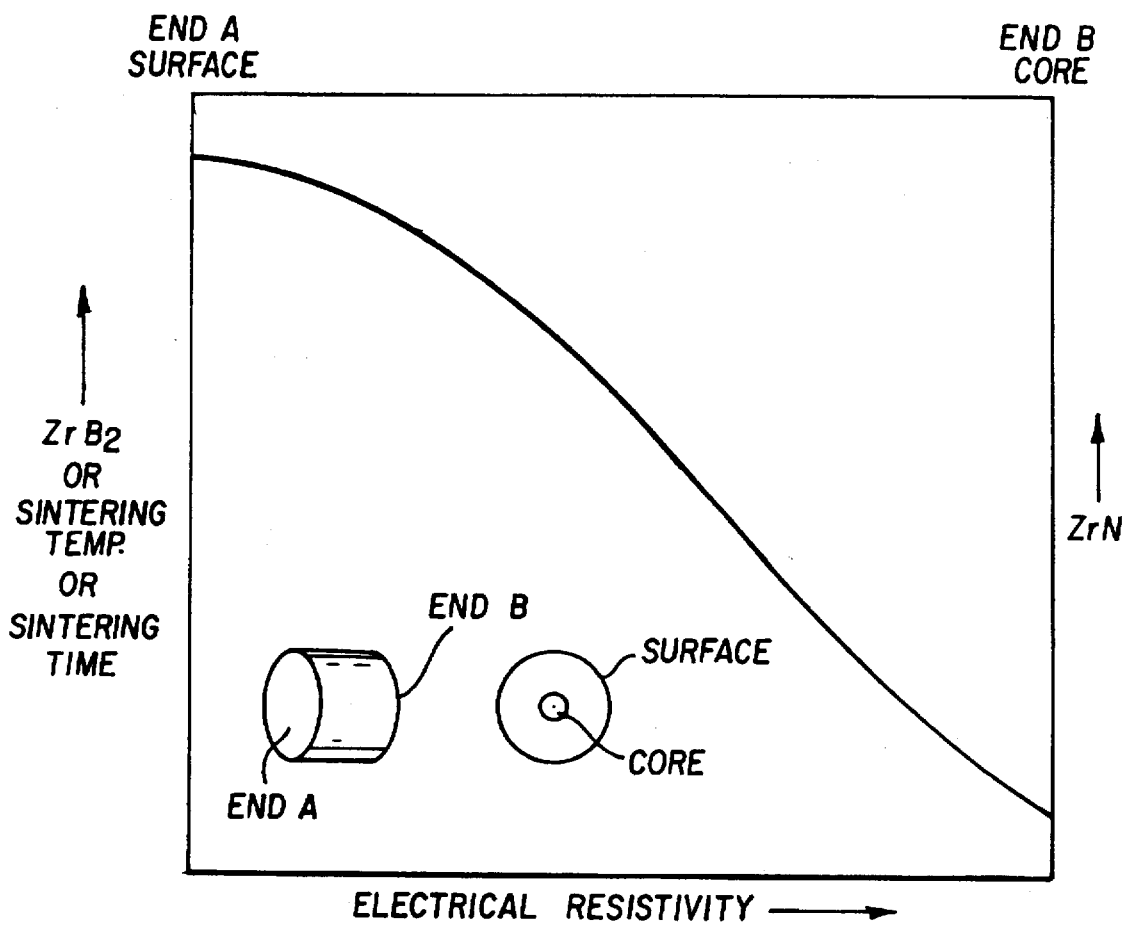
FIG. 4 is a schematic of electrical resistivity changes with $ZrB_2$ concentration as well as sintering time and temperature.

In accordance with Example 1, FIG. 2 shows the x-ray diffraction pattern for Y-TZP+10 wt. % $ZrB_2$ composite in which the peaks are due to tetragonal $ZrO_2$ and only a very weak peak of monoclinic $ZrO_2$ are present. FIG. 3 shows strong x-ray diffraction peaks of cubic $ZrO_2$ and ZrN peaks for the compositions presented in Example 3. FIG. 4 shows a schematic of how the electrical resistivity changes with $ZrB_2$ concentration as well as sintering temperatures and sintering time.

Comparative Example 2

Figure 5:
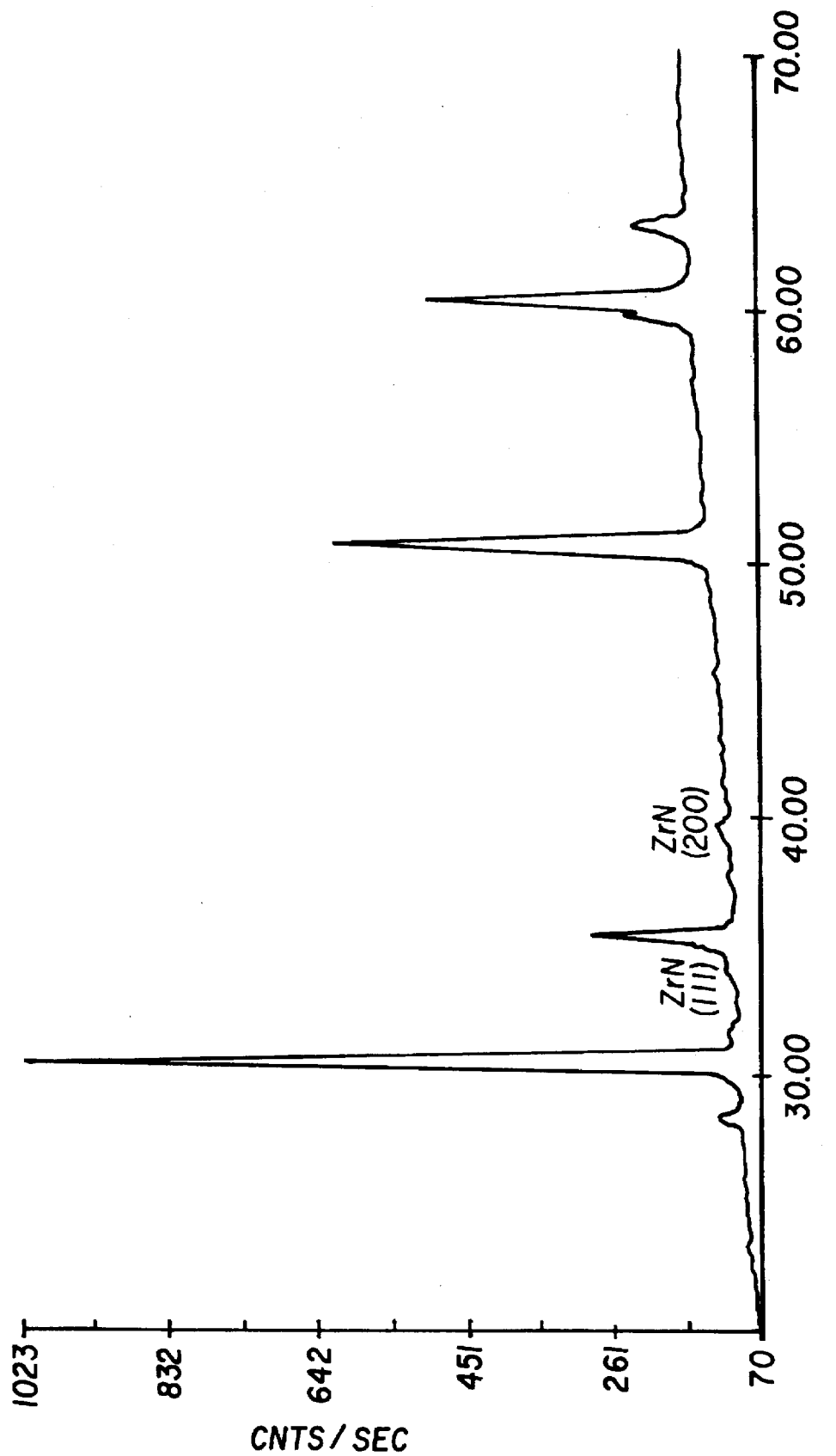
FIG. 5 shows x-ray diffraction dam of an article showing the presence of a very weak ZrN diffraction peak.

Green samples of zirconia containing various concentration of $ZrB_2$ were sintered at 1200°–1600° C. in an atmosphere of $N_2$. In addition to the presence of tetragonal $ZrO_2$ peaks in X-ray diffraction pattern, very weak ZrN peaks were also observed for 25 wt % $ZrB_2$ as shown in FIG. 5. However, no surface electrical conductivity was measured. This comparative example shows the importance of the $H_2$+$N_2$ gas mixture.

The methods of the invention are applicable to the production of a variety of articles, particularly cutting tools and abrasion and wear resistant pans, in that many tools have a longer service life if the working surface is a hard cast shell overlying a relatively tougher core. Examples of tools requiting relatively tough cores include slitter knives, punches and dies for cloth, cardboard, metal, polymeric materials and for paper coated with abrasive material such as silver halides and the like, specifically films for advanced photo systems (APS).

The surface electrical conductivity minimizes, if not eliminates, tribo-electric static charge in an application where moving polymeric materials come in contact with conveyance rollers and guides, for transporting photographic film base or papers. The controlled surface conductivity with the bulk being insulating makes this material useful for an integrated capacitor.

Since, the making of ZrN is a diffusion controlled process, the thickness of the conductive layer (due to ZrN concentration) can be varied by varying either the sintering temperature and/or sintering time.

While the invention has been described with particular reference to a preferred embodiment, it will be understood

TABLE I

| Example | Material | XRD of surfaces exposed to gas flow | Resistivity of surfaces exposed to gas flow (Ω/sq.) | XRD of surfaces not exposed to gas flow | Resistivity of surfaces not exposed to gas flow (Ω/sq.) |
| --- | --- | --- | --- | --- | --- |
| Comparative 1 | TZ-3YB | Tetragonal $ZrO_2$ | Very high | Tetragonal $ZrO_2$ | Very high |
| 1 | 90 wt. % TZ-3YB + 10 wt. % $ZrB_2$ | Tetragonal $ZrO_2$ + weak ZrN | Moderate | Tetragonal $ZrO_2$ | Very high |
| 2 | 75 wt. % TZ-3YB + 25 wt. % $ZrB_2$ | Cubic $ZrO_2$ and strong ZrN | 49.1 | Tetragonal $ZrO_2$ and weak ZrN | Very high |
| 3 | 50 wt. % TZ-3YB + 50 wt. % $ZrB_2$ | Cubic $ZrO_2$ and strong ZrN | 0.284 | Cubic $ZrO_2$ and strong ZrN | 0.219 |

X-ray diffraction data showing the presence of ZrN and $ZrO_2$ phases for samples having different concentration of $ZrB_2$ sintered in 4% $H_2$+96% $N_2$ mixture are presented in the FIGS. 2 and 3.

by those skilled in the art the various changes can be made and equivalents may be substituted for elements of the preferred embodiment without departing from the scope of the invention. In addition, many modifications may be made to adapt a particular situation in material to a teaching of the invention without departing from the essential teachings of the present invention.

We claim:

1. A ceramic article containing a core comprising zirconia alloy and a shell comprising zirconium nitride wherein said core comprises from 99.9 to 50 weight % zirconia alloy and from 0.1 to 50 weight % $ZrB_2$.

2. The article of claim I wherein the zirconia alloy is doped with from 0.5 to 5 mole % yttria.

3. The article of claim 2 wherein yttria comprises 3 mole percent.

4. The article of claim 1, wherein, said core, being interior, consists essentially of particulate sintered zirconium oxide alloy and $ZrB_2$, said particulate zirconium oxide alloy having an elemental composition consisting essentially of Zr, O and at least one element selected from the group consisting of oxides of Mg, Ca, Y, Sc, Ce and rare earth elements, said particulate zirconium oxide alloy having a substantially tetragonal or substantially cubic structure;

said shell being exterior to and continuous with said core, said shell including zirconium nitride.

* * * * *